United States Patent [19]
Lund

[11] Patent Number: 6,008,480
[45] Date of Patent: Dec. 28, 1999

[54] INDUCTION HEATING APPARATUS AND METHOD FOR FUSING BATTERY CELL TERMINALS

[75] Inventor: David L. Lund, Minneapolis, Minn.

[73] Assignee: GNB Technologies, Inc., Mendota Heights, Minn.

[21] Appl. No.: 08/799,294

[22] Filed: Feb. 13, 1997

[51] Int. Cl.⁶ .................................................. H05B 6/10
[52] U.S. Cl. .......................... 219/633; 219/635; 219/656; 219/676; 219/677; 29/623.1; 425/174.8 R
[58] Field of Search ..................... 219/633, 635, 219/603, 604, 674, 676, 677, 632, 656; 228/179.1, 180.1; 29/623.1, 623.2, 623.4; 264/403; 425/174.8 R, 174

[56] References Cited

U.S. PATENT DOCUMENTS

| | | |
|---|---|---|
| 2,496,950 | 2/1950 | Marcus et al. ............................ 219/656 |
| 3,598,171 | 8/1971 | Schutz . |
| 3,684,852 | 8/1972 | Seyfried . |
| 4,119,137 | 10/1978 | Eberle . |
| 4,246,461 | 1/1981 | Jeppson . |
| 4,258,241 | 3/1981 | Soworowski ............................. 219/656 |
| 4,468,741 | 8/1984 | Simonton . |
| 4,501,943 | 2/1985 | Lund . |
| 4,509,253 | 4/1985 | Eberle . |
| 4,523,068 | 6/1985 | Lund et al. . |
| 4,642,442 | 2/1987 | Mullane et al. ........................ 219/633 |
| 4,659,892 | 4/1987 | Hammond et al. ..................... 219/656 |
| 5,034,586 | 7/1991 | Havas et al. . |

Primary Examiner—Philip H. Leung
Attorney, Agent, or Firm—Leydig, Voit & Mayer, Ltd.

[57] ABSTRACT

An induction heating method and apparatus for simultaneously and efficiently fusing battery cell terminal posts and bushings in a battery production line. The apparatus includes an induction heating generator having a T-shaped bus bar for symmetrically supporting a plurality of pairs of induction heating coils, with one coil of each pair being supported on the forward side of a transverse bus bar section and the other coil of each pair being supported on a rear side of the transverse bus bar section. The coils each have respective mounting structures for permitting individual vertical adjustment of the coil with respect to the bus bar to enable uniform positioning of the coils with respect to a plurality of bushings and terminal posts for effecting uniform depth fusion of the plurality of posts and bushings. The induction heating coils define a water flow path through which cooling water is circulated during the fusion operation, while efficiencies and symmetries in the bus bar design enable it to support and conduct current to the respective coils without water cooling.

35 Claims, 6 Drawing Sheets

INDUCTION HEATING APPARATUS AND METHOD FOR FUSING BATTERY CELL TERMINALS

FIELD OF THE INVENTION

The present invention relates generally to lead acid storage batteries, and more particularly, to an improved apparatus and method for fusing battery cell terminal posts to bushings in a battery casing to form terminals of the completed battery.

BACKGROUND OF THE INVENTION

In the manufacture of lead acid storage batteries, it is customary to mold lead bushings in the plastic cover of the battery and to thereafter fuse the bushings to posts of the battery cell assemblies. It has long been the practice to melt the ends of the posts and bushings by means of manually operated acetylene torches. Not only does manual acetylene torch burning of the posts and bushings fail to lend itself to use in fully automated battery production lines, the quality and depth of the fused areas cannot be uniformly controlled.

While various proposals have been made for automatically fusing battery terminal posts and cover bushings by means of acetylene torch heating, electrical resistance heating, electrical induction heating, and tungsten inert gas welding, such proposals have faced various drawbacks, including the inability to obtain reliable fusion depths within the requisite processing time, undesirable melting of the cover about the bushings, and unacceptable appearance of the finished terminals.

Although fusion of battery terminal posts and bushings by means of induction heating has been found to be particularly advantageous, conductive losses and inefficiencies in the design of the induction heating coils and their supporting bus bar structures can increase the heating cycle time necessary for achieving adequate fusion. Longer heating cycles, in turn, increase the risk of damage to or weakening of the seals between the bushing and plastic cover, which may render the battery defective or create a potentially dangerous condition during usage.

Moreover, while it is desirable to simultaneous fuse a plurality of posts and bushings in automated production lines, conducive losses and difficulties in obtaining uniform fusion depths can be compounded by increased numbers of induction heating coils that are simultaneous operated. Heretofore, it has not been possible to achieve satisfactory fusion with more than two simultaneously operated induction heating coils, which again can impede automated production lines. Prior efforts to fuse four or more terminals simultaneously has resulted in underheating of some of the terminals and overheating and damage to other of the terminals. Increased conductive losses also may necessitate greater cooling of the coil supporting bus bar structures, thereby increasing the complexity of the apparatus.

OBJECTS AND SUMMARY OF THE INVENTION

It is an object of the present invention to provide an improved induction heating apparatus and method for fusing terminal posts and cover bushings in forming battery terminals.

Another object is to provide an apparatus and method as characterized above which can be operated more quickly and efficiently in effecting proper fusion depths of the finished terminals without damage to the hermetic seals between the cover and bushing.

A further object is to provide an apparatus and method of the foregoing type which is adapted for simultaneously fusing greater numbers of posts and bushing to substantially uniform fusing depths than heretofore possible. A related object is to provide such apparatus and method effective for simultaneously fusing four, six, or eight terminals.

Yet another object is to provide and induction heating apparatus of the above kind which has a relatively simple and economical to manufacture coil supporting bus bar structure that can be used without the necessity for water cooling.

Other objects and advantages of the invention will become apparent upon reading the following detailed description and upon reference to the drawings, in which:

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE DRAWINGS

Figures 1, 2:
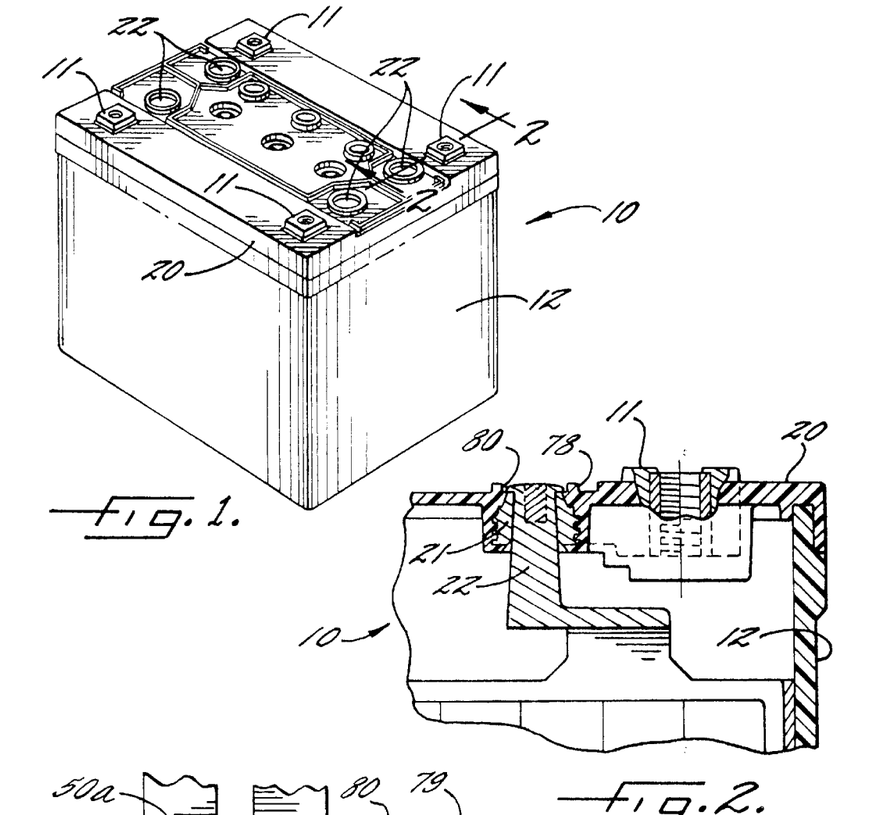
FIG. 1 is a perspective of a lead acid storage battery having terminals formed by the apparatus and method of the present invention.
FIG. 2 is an enlarged fragmentary section of one of the fused terminals of the battery shown in FIG. 1, taken in the plane of line 2—2.

Referring now to FIGS. 1 and 2 of the drawings, there is shown an illustrative lead acid storage battery 10 having terminals 11 on a top side thereof, which in this case are four in number. The illustrated battery 10 includes a case 12, preferably made of plastic, containing a plurality of battery cell elements that are electrically coupled to the terminals 11 in a conventional manner.

Figure 3:
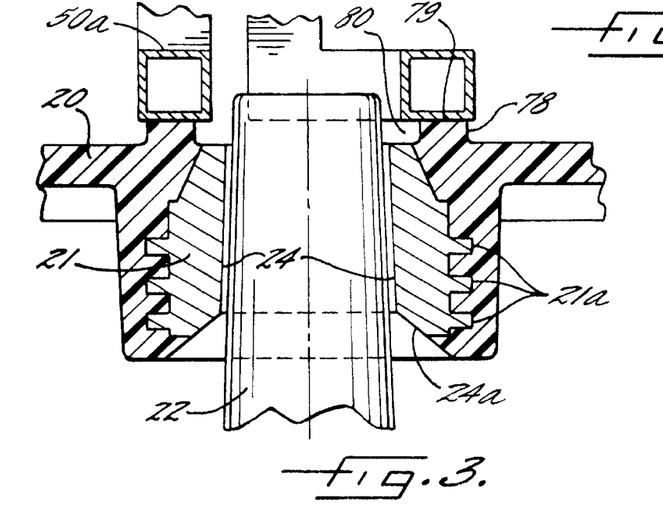
FIG. 3 is an enlarged fragmentary section showing a battery in operatively positioned relation to one of the induction heating coils of the induction heating apparatus shown in FIG. 4, prior to fusing of the terminal post and cover bushing.

During manufacture of such batteries, it is customary to assembly onto the case 12 a cover 20 having lead terminal bushings 21 mounted therein with lead terminal posts 22 of the battery cell elements extending coaxially through the bushings 21, as depicted in FIG. 3. The terminal posts 22 have a slight upward external taper and are positionable into respective tapered axial openings 24 of the bushings 21 which are shaped generally complementary to the terminal posts 21. The lowermost end of each bushing opening 24 has an outwardly flared chamfer 24a for guiding the respective terminal post 22 into proper seating relation to the bushing during assembly of the cover 20 onto the case 12. In the illustrated embodiment, the terminal posts 22 are of sufficient height that upon assembly of the cover 20 onto the case 12, the upper ends of each post 22 extends a predetermined distance, such as about 0.100 inch, above the upper axial end of the respective bushing 21. For reliably supporting the bushings 21 in the cover 20, the bushings 21 preferably have a ribbed outer peripheral mounting portion 21a adapted to provide a strong mechanical connection with the plastic cover 20, while forming an effective seal about the periphery of the cover and bushing.

Figure 4:
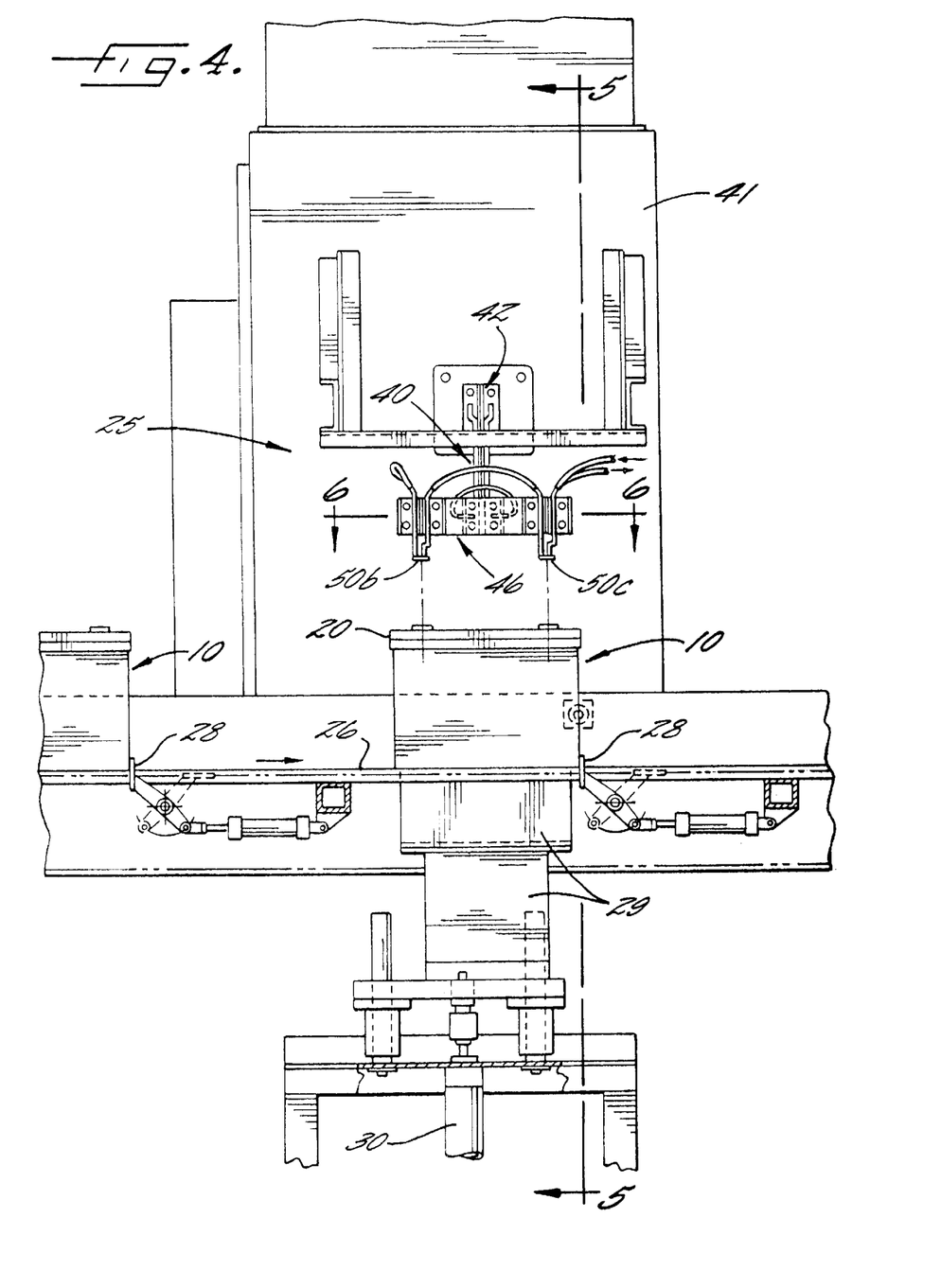
FIG. 4 is a front elevation view of the illustrated induction heating apparatus.
Figure 5:
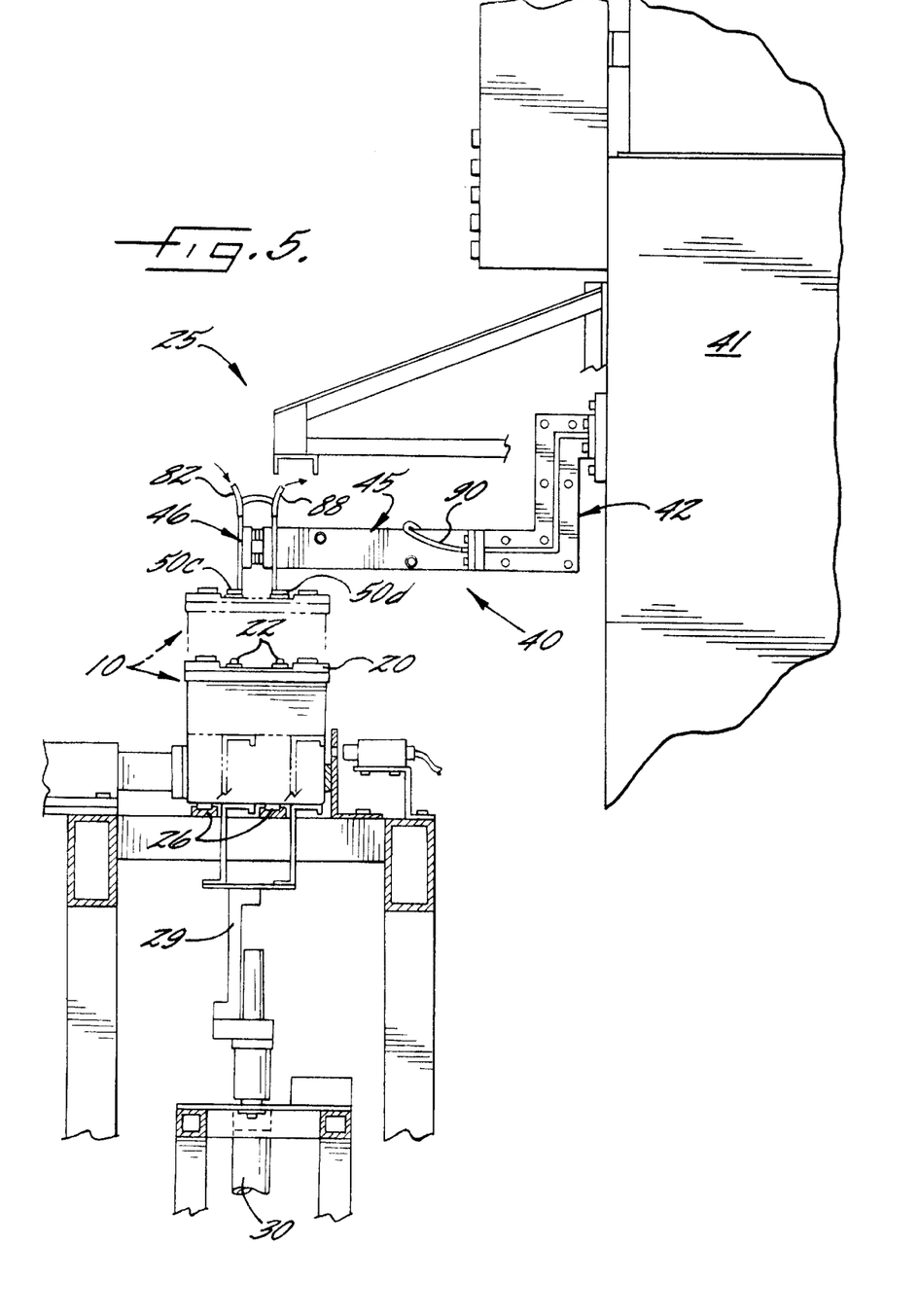
FIG. 5 is a fragmentary section of the induction heating apparatus shown in FIG. 4, taken in the plane of line 5—5.

For fusing the terminal posts 22 and bushings 21, an induction heating apparatus 25 is provided that preferably is part of an automated production line having a conveyor track 26 upon which batteries 10 in assembly are moved through successive operating stations (FIGS. 4 and 5). The conveyor track 26 may be of a type disclosed in U.S. Pat. No. 4,523,068, assigned to the same assignee as the present application, the disclosure of which is incorporated herein by reference. A plurality of selectively actuatable pivotal stops 28 are mounted on an underside of the track 26 for stopping the batteries at predetermined operating stations, including an induction heating station as shown in FIGS. 4 and 5, and an elevator 29 operated by an air cylinder 30 is provided for lifting the battery 10 off the track 26 at the induction heating station to position the terminal posts 22 and bushings 21 thereof into operative relation to the induction heating apparatus 25 to effect fusion of the terminal posts 22 and bushings 21 of the battery, and then to return the battery to its lowered position on the track 26 for further transfer and processing.

In accordance with the invention, the induction heating apparatus includes at least four induction heating coils that are operable for effecting simultaneous, substantially uniform depth fusion of a corresponding number of terminal posts and bushings of batteries being assembled. More particularly, the induction heating apparatus includes a T bus having a central section connected to an induction heating generator and a transverse section for supporting and electrically conducting current through a plurality of induction heating coils supported on forward and rearward sides of the transverse section. In the illustrated embodiment, the induction heating apparatus 25 comprises a T bus 40 supported in cantilever fashion from a high voltage, induction heating generator 41 of a known type, for example, having a 30 kilowatt capacity at 450 kHz.. The T bus in this instance is bolted to a dropper bus 42 of the generator 41. The T bus 40 comprises a central section 45 and a transverse section 46 disposed in perpendicular relation to an outer end of the central section 45 for supporting a plurality of induction heating coils 50a, 50d on one side thereof and a plurality of induction heating coils 50b, 50c on an opposite side thereof. In the illustrative embodiment, two induction heating coils 50b, 50c are supported on a forward side of the transverse T bus section 46 and two induction heating coils 50a, 50d are supported on a rear side of a transverse T bus section 46. The coils 50a–50d are disposed symmetrically with respect to both the central T bus section 45 and the transverse T bus section 46 for efficient current conduction and are operable for simultaneously fusing the four terminal posts 22 and bushings 21 of the illustrated battery.

Figure 6:
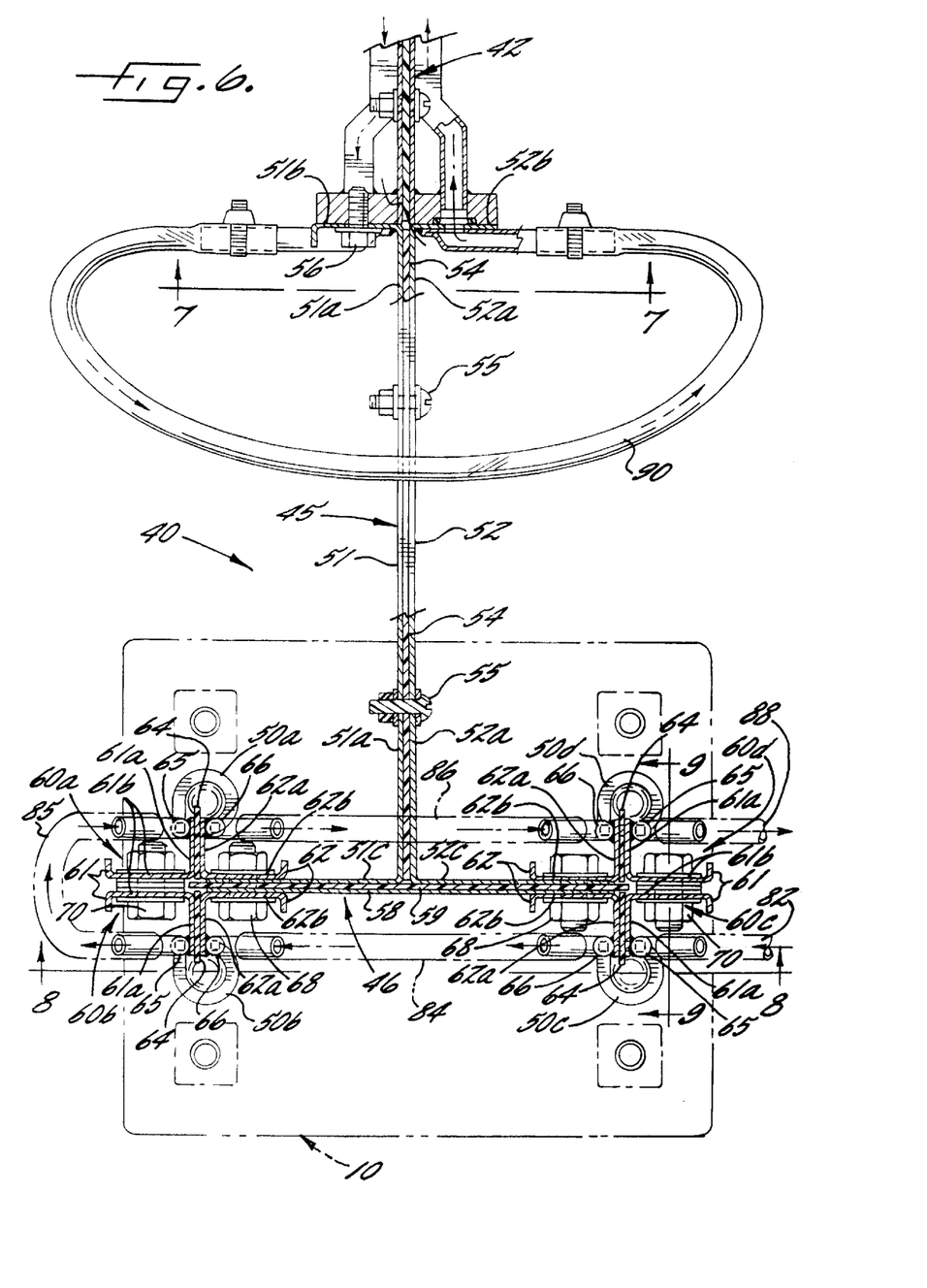
FIG. 6 is an enlarged horizontal section of the bus bar structure of the illustrated induction heating apparatus, taken in the plane of line 6—6 in FIG. 4.
Figure 7:
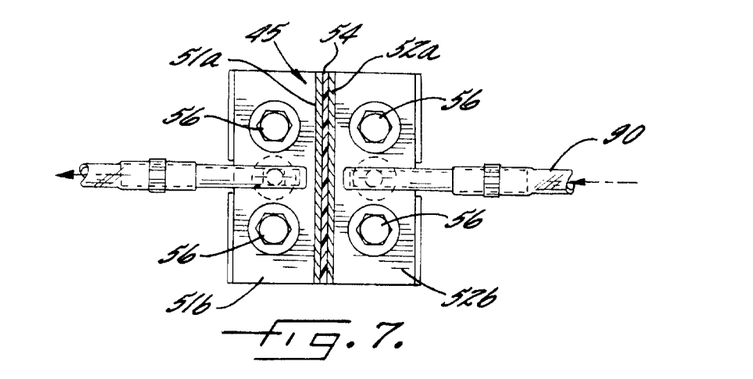
FIGS. 7 and 8 are enlarged fragmentary vertical sections of the bus bar structure, taken in the planes of lines 7—7 and 8—8, respectively, in FIG. 6.
Figure 8:
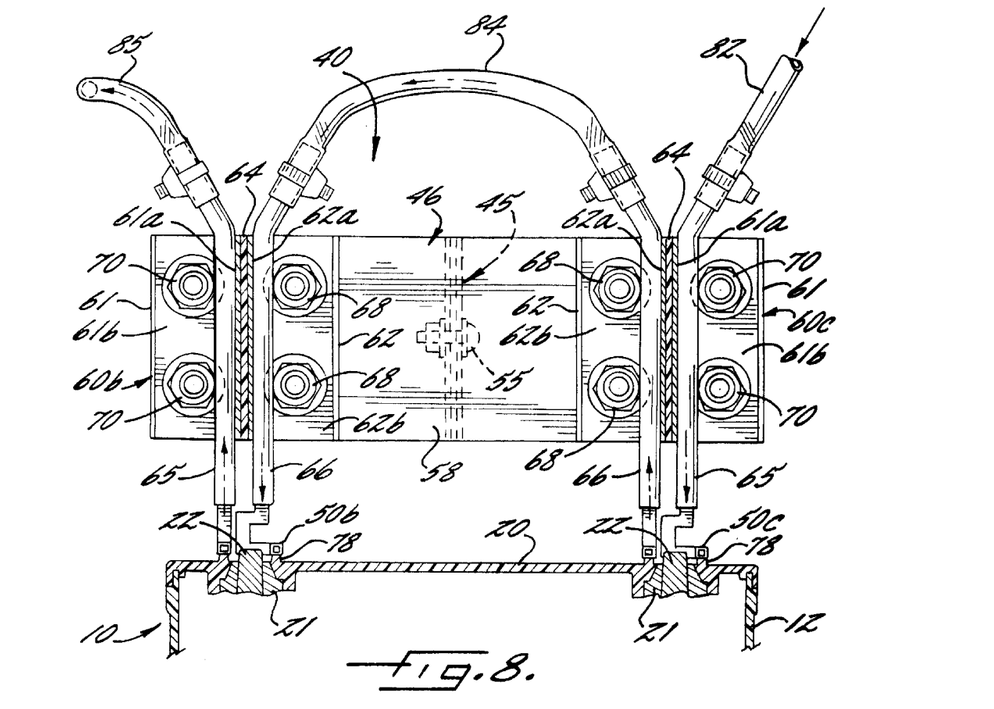
Figure 9:
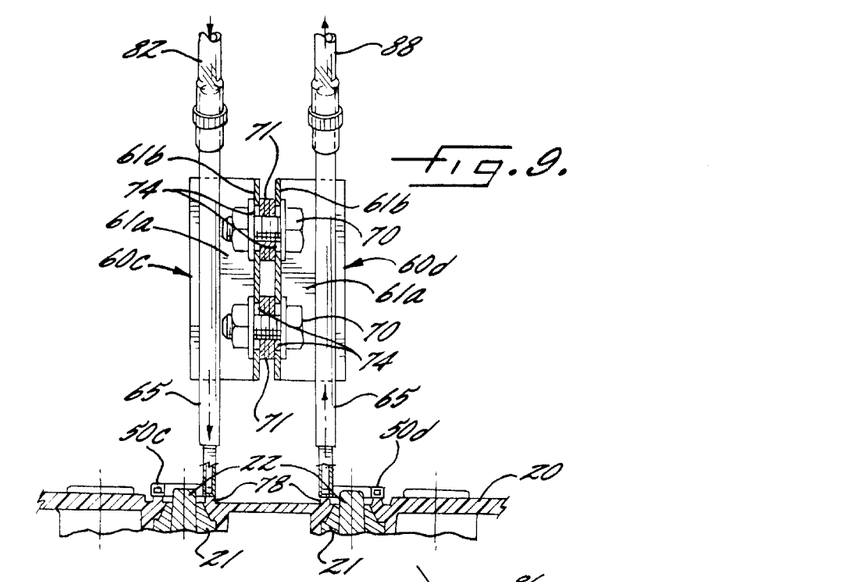
FIG. 9 is an enlarged vertical section of two of the induction heating coils of the illustrated induction heating apparatus, taken in the plane of line 9—9 in FIG. 6, and disposed in operative position to a battery, prior to fusing of the terminal posts and bushings of the battery.

The illustrated T bus 40 comprises a pair of L-shaped plates 51, 52, preferably made of copper, having first legs 51a, 52a separated by an insulating spacer 54, such as a teflon sheet, and coupled together by non-conductive bolts 55, preferably made of plastic, which define the central T bus section 45. Inwardly disposed ends of the first legs 51a, 52a, are formed with out turned mounting flanges 51b, 52b fixed to the dropper bus 42 by bolts 56 (FIGS. 6 and 7). The transverse T bus section 46 is formed by perpendicular legs 51c, 52c of the L-shaped plates 51, 52 that extend outwardly in opposite directions to each other and a forward plate 58 secured to the perpendicular legs 51c, 52c with an insulating spacer 59 therebetween.

For securing the induction heating coils 50a–50d to the transverse T bus section 46, each induction heating coil has a respective mounting structure 60a–60d comprising a pair of L-shaped copper plates 61, 62, which again preferably are made of copper (FIG. 6). The L-shaped plates 61, 62 of each mounting structure 60a–60b have a first leg 61a, 62a disposed in parallel relation to each other and to the central T bus section 45 with a plastic insulating sheet 64 interposed therebetween, and a second leg 61b, 62b extending from the respective first leg 61a, 62a in opposite outwardly extending relation to each other and in parallel relation to the transverse T bus section 46 (FIGS. 6 and 10).

Each induction heating coil 50a–50d is formed from a respective continuous length of copper tubing, which in this case defines a single annular coil turn and a pair of upstanding mounting legs 65, 66 that are secured to respective first legs 61a, 62a of the L-shaped mounting plates 61, 62 by appropriate weldments. While in the illustrated embodiment, the coils 50a–50b are shown as having a single annular turn, it will be understood that the coils may be formed with a multiplicity of helical turns. For purposes herein, the term "coil" shall encompass induction heating coils having one or more turns. The upstanding mounting legs 65, 66 of each coil preferably extend a distance above the L-shaped plates 61, 62 of the mounting structures.

For securing the mounting structures 60a, 60b and 60c, 60d of forwardly and rearwardly adjacent pairs of induction heating coils 50a, 50b and 50c–50d to the transverse T bus section 46, the legs 62b of adjacent L-shaped plates 62 are secured together on opposite sides of the transverse T bus section 46 by nonconductive bolts 68 (FIG. 6). Such securement of the L-shaped plates 62 has the effect of supporting the coils 50a, 50b, and 50c, 50d and the second L-shaped plates 61 of each pair of mounting structures 60a, 60b and 60c, 60d in cantilevered relation at opposite ends of the transverse T bus section 46 as a result of the welded securement of the legs 65, 66 of the induction heating coils to the L-shaped plates 61, 62. To rigidify the assembly and to enable electrical conduction between forwardly and rearwardly disposed coils 50a, 50b and 50c, 50d, the forwardly and rearwardly adjacent legs 61b of the mounting plates 61 are secured together by conductive bolts 70, preferably made of copper, with conductive washers 71 rigidly interposed between the legs 61b of the L-shaped plates 61.

Figure 10:
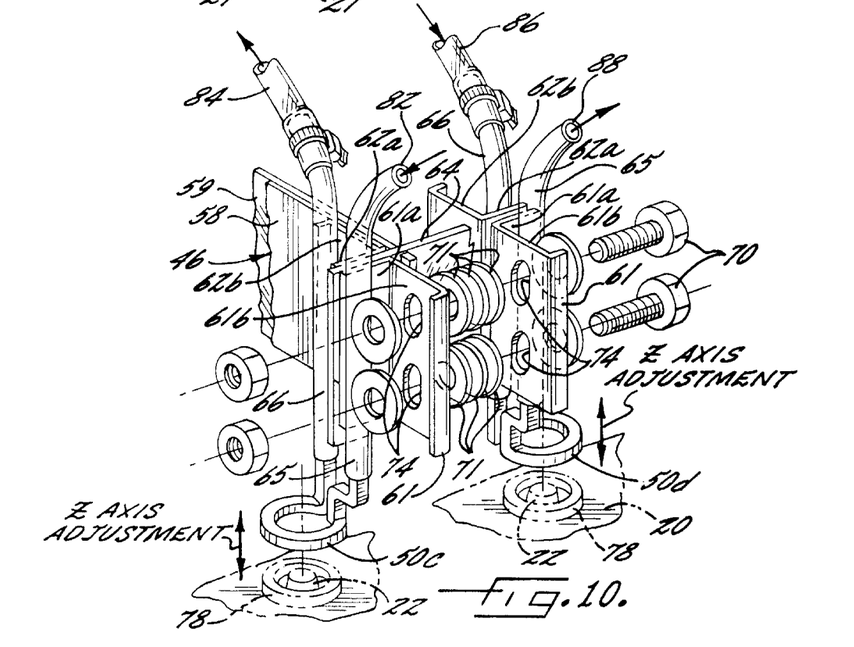
FIG. 10 is an exploded perspective of a portion of the bus bar structure of the illustrated induction heating apparatus.

In keeping with the invention, the induction heating coils each are adapted for selective vertical positioning along a Z or vertical axis, as indicated in FIG. 10, relative to the transverse T bus section 46 for enabling optimum induction heating and fusion of the battery terminal posts 22 and bushings 21. To this end, the mounting structures 60a–60b and the transverse T bus section 46 are formed with mounting apertures that permit selective vertical positioning of the mounting structures 60a–60b individually with respect to the transverse T bus section 46. In the illustrated embodiment, the legs 61b, 62b of the L-shaped plates 61, 62 each are formed with vertically elongated apertures 74 that permit selective positioning of each of the coil mounting structures 60a–60d relative to the transverse T bus section 46, as well as selected positioning of adjacent forwardly and rearwardly located coils 50a, 50b and 50c, 50d with respect to each other. Upon proper positioning of the coils, the bolts 68, 70 may be appropriately secured. To make adjustments in the relative vertical positions of the coils 50a–50d, it is only necessary to loosen the mounting bolts 68, 70 and reposition the coils.

For conducting current in series through the coils 50a–50d from the generator 41, it will be seen that the T bus 40, the copper tubings which form the coils 50a–50d, and mounting structures 60a–60d define a current flow path which comprises the L-shaped plate 51 which is coupled to the generator 41 via the dropper bus 42, the L-shaped plate 62 of the coil mounting structure 60a, the coil 50a, the L-shaped plate 61 of the mounting structure 60a, the conductive bolts 70, the L-shaped plate 61 of the mounting structure 60b, the coil 50b, the L-shaped plate 62 of the mounting structure 60b, the forward plate 58 of the transverse T bus section 49, the L-shaped plate 62 of the mounting structure 60c, the coil 50c, the L-shaped plate 61 of the mounting structure 60c, the L-shaped plate 61 of the mounting structure 60d, the coil 50d, the L-shaped plate 62 of the mounting structure 60d, and the L-shaped T bus plate 52 which is electrically coupled to the generator 41 via the dropper bus 42. The non-conductive bolts 55, 68 prevent short circuiting of the current flow path between the adjacent plates they secure together.

To effect simultaneous fusion of such a multiplicity of terminal posts and bushings to proper and substantially uniform fusion depth, it has been determined that a critical condition is that the terminal posts 22 and bushings 21 be uniformly located in the vertical Z direction relative to the coils 50a–50d. To facilitate such uniform positioning of the multiplicity of bushings 21 and terminal posts 22 and to provide self-contained molds about each bushing and terminal post for retaining and forming melted lead during an induction heating and fusion operation, the cover 20 of each battery in this instance is formed with an upstanding annular lip 78 surrounding each respective bushing 21 and terminal post 22 (FIG. 3). Each lip 78 defines a flat upper reference surface 79 for engagement with a respective one of the induction heating coils 50a–50b, such as upon raising of the battery 10 into operating position by the elevator 29. To ensure such engaging condition with the multiplicity of coils 50a–50b, as indicated above, the coil mounting structures 60a–60d may be individually adjusted with respect to the T bus 40 and with respect to each other. Hence, when the battery 10 is moved into operative relation to the induction heating apparatus 25, each reference surface 79, as defined by the respective upstanding lip 78, is in engaging relation with an underside of a respective annular coil 50a–50d for establishing a predetermined position of the bushing 21 and the terminal post 22 relative to the coil. As shown in FIG. 3, in such properly seated position, each coil 50a–50d is seated on an upstanding annular lip 78 of the cover and is spaced slightly above the upper end of the respective bushing 21 with the post 22 extending partially, and preferably about midway, into the annular opening defined by the coil.

With the coil in such predetermined spaced relation to both the bushing 21 and terminal post 22, upon energization of the induction heating generator 41, current flow through the T bus 40 and coils 50a–50d induces high voltage heating effects in the bushings 21 and posts 22 disposed in co-axial relation to the coils. Such induction heating has been found to effect substantially instantaneous and uniform heating of the multiplicity terminal bushings 21 and post 22 to temperatures well in excess of the melting point of the lead. By virtue of the predetermined, and substantially uniform orientation of each coil 50a–50d of the induction heating apparatus 25 relative to the bushings 21 and terminal posts 22, heating and fusion of the bushings and terminal posts can be effected to relatively uniform, reliable fusion depths, without damage to the surrounding plastic material of the cover 20 or the seal about the cover 20 and bushing 21. As depicted in FIGS. 2 and 3, the annular lips 78 of the cover 20 not only define the reference surfaces 79, but further form a self-contained mold recess 80 (FIG. 3) within which molten lead of the terminal posts 22 and bushings 21 are contained during the fusion operation.

For cooling the coils 50a–50d during an induction heating cycle, the individual copper tubings which define the coils 50a–50d are connected in series to form a single continuous water cooling circuit or conduit through which cooling water may be directed from a common source. To that end, a flexible plastic tube 82 communicating with a cooling water supply is connected to one upstanding mounting leg of the coil 50c, the other leg of the coil 50c being connected to and communicates with a leg of the coil 50b by a flexible tube 84; a flexible tube 85 connects between legs of the coils 50b and 50a; a flexible tube 86 connects between legs of the coils 50a, 50d; and a return line or flexible tube 88 communicates between the coil 50d and return reservoir. Hence, cooling water directed through the tube 82 will flow in series through the coils 50c, 50b, 50a, and 50d, and then will be directed to the return reservoir by the return line 88.

In keeping with the invention, by virtue of the symmetry and efficiencies in the design of the induction heating coil supporting T bus 40, it unexpectedly has been found to be unnecessary to provide water cooling of the T bus 40. Hence, the expense and complexity of cooling the T bus is eliminated. In the illustrated embodiment, a return line 90 is provided for the water cooling line within the generator 41 and the dropper bus 42. (See FIG. 6).

From the foregoing, it can be seen that the induction heating apparatus of the present invention is adapted for effecting quick and efficient fusion of battery terminal posts and bushings to uniform fusion depths without damage to the battery covers or to the seals between the covers and bushings. Moreover, the induction heating apparatus is operable for simultaneously fusing greater numbers of terminal posts and bushings to uniform fusion depths than heretofore possible. It will be understood by one skilled in the art that while the illustrated apparatus supports two induction heating coils on front and rear sides of the transverse T bus section, alternatively, greater numbers of pairs of induction heating coils could be supported by the transverse T bus section for enabling simultaneous fusion of batteries having four, six, eight or more terminals, or alternatively, for simultaneously fusing bushings and terminal posts of a plurality of batteries in an automated production line. Furthermore, the induction heating coil supporting bus bar structure has a relatively simple and economical to manufacture design and can be used without the necessity for water cooling.

What is claimed is:

1. An apparatus for fusing lead terminal posts and bushings to form terminals of a battery comprising an induction heating generator selectively operable for generating a high frequency oscillating current, a bus bar supported by and electrically coupled to said generator, a plurality of induction heating coils supported in a row on one side of said bus bar and a plurality of induction heating coils supported in a row on an opposite side of said bus bar, said rows of induction heating coils being in parallel relation to each other with the induction heating coils disposed in corresponding relation to the location of the terminals and bushings of the battery to be fused, said induction heating coils being electrically coupled to said bus bar such that upon energization of said generator said coils are operable for simultaneously inducing current flow in respective terminal posts and bushings concentrically located with respect to the coils for simultaneously fusing the respective terminal posts and bushings.

2. The apparatus of claim 1 in which two induction heating coils are supported on one side of said bus bar and two of said induction heating coils are supported on an opposite side of said bus bar.

3. The apparatus of claim 1 in which said bus bar has a T-shape configuration having a central section extending outwardly from said generator and a transverse section at an outer end of said central section, a plurality of said coils being mounted on one side of said transverse section and a plurality of said coils being mounted on an opposite side of said transverse section.

4. The apparatus of claim 3 in which pairs of said coils are supported by said transverse section in adjacent relation to each other with one coil of each pair being disposed adjacent a forward side of said transverse section and the other coil of each pair being disposed adjacent a rear side of said transverse section.

5. The apparatus of claim 4 in which said transverse section is perpendicular to said central section.

6. The apparatus of claim 3 in which a plurality of said coils are disposed on one side of said central section and a plurality of said coils are disposed on an opposite side of said central section.

7. The apparatus of claim 3 in which said coils each are supported on said transverse bus section by a respective mounting structure that permits selected vertical positioning of the coil relative to the transverse bus bar section.

8. The apparatus of claim 7 in which each said coil is defined by a tubing having at least one annular turn with a pair of legs extending upwardly from said at least one annular turn.

9. The apparatus of claim 8 in which said pair of legs of each coil is supported by and electrically connected to the respective mounting structure of the coil.

10. The apparatus of claim 1 in which said coils each are defined by a respective uninterrupted length of tubing, said respective uninterrupted lengths of tubing each being electrically connected to said bus bar.

11. An apparatus for fusing lead terminal posts and bushings to form terminals of a battery comprising an induction heating generator selectively operable for generating a high frequency oscillating current, a bus bar supported by and electrically coupled to said generator, a plurality of pairs of induction heating coils supported by said bus bar in parallel relation to each other, and said induction heating coils being electrically coupled to said bus bar such that upon energization of said generator said coils are operable for simultaneously inducing current flow in respective terminal posts and bushings concentrically located with respect to the coils for simultaneously fusing the respective terminal posts and bushings.

12. The apparatus of claim 11 in which one coil of each pair is supported on one side of said bus bar and the other coil of each pair is supported on an opposite side of said bus bar.

13. The apparatus of claim 11 in which each coil is releasably and unadjustably supported on said bus bar for selected relative vertical positioning.

14. The apparatus of claim 13 in which each coil is defined by a respective length of copper tubing.

15. The apparatus of claim 14 in which each coil tubing has a respective mounting structure for individually and releasably supporting the coil on the bus bar.

16. An apparatus for fusing lead terminal posts and bushings to form terminals of a battery comprising an induction heating generator selectively operable for generating a high frequency oscillating current, a bus bar supported by and electrically coupled to said generator, at least four induction heating coils supported by said bus bar, said induction heating coils being disposed in at least two parallel rows and at locations corresponding to the locations of the terminal posts and bushings of the battery, and said induction heating coils being electrically coupled to said bus bar such that upon energization of said generator said coils are operable for simultaneously inducing current flow in respective terminal posts and bushings concentrically located with respect to the coils for simultaneously fusing the respective terminal posts and bushings.

17. The apparatus of claim 16 in which pairs of said coils are supported at spaced apart locations on said bus bar.

18. The apparatus of claim 17 in which one coil of each pair is supported on one side of said bus bar, and the other coil of each pair is supported on an opposite side of said bus bar.

19. The apparatus of claim 16 in which said coils each are individually supported for adjustable vertical positioning on said bus bar.

20. The apparatus of claim 16 in which said bus bar electrically connects said coils in series.

21. An apparatus for fusing lead terminal posts and bushings to form terminals of a battery comprising an induction heating generator selectively operable for generating a high frequency oscillating current, a bus bar supported by and electrically coupled to said generator, a plurality of induction heating coils supported by said bus bar, said induction heating coils being disposed in at least two parallel rows and at locations corresponding to the locations of the terminal posts and bushings of the battery, said induction heating coils being electrically coupled to said bus bar such that upon energization of said generator said coils are operable for simultaneously inducing current flow in respective terminal posts and bushings concentrically located with respect to the coils for simultaneously fusing the respective terminal posts and bushings, and said induction heating coils each being releasably and vertically adjustably supported on said bus bar for permitting predetermined substantially uniform positioning of the coils relative to respective terminal posts and bushings for enabling simultaneous, substantially uniform depth fusion of said terminal posts and bushings.

22. The apparatus of claim 21 in which said coils each are supported on said bus bar by a respective mounting structure that permits selected vertical positioning of the coil relative to the transverse bus bar section.

23. The apparatus of claim 22 in which said mounting structures are secured to said bus bar by mounting bolts, and one of said bus bar section and respective coil mounting structure being formed with vertically elongated mounting bolt receiving slots for enabling selective relative vertical positioning of the mounting structure relative to the transverse bus bar section.

24. An apparatus for fusing lead terminal posts and bushings to form terminals of a battery comprising an induction heating generator selectively operable for generating a high frequency oscillating current, a bus bar supported by and electrically coupled to said generator, a plurality of induction heating coils supported by said bus bar, said induction heating coils being disposed in at least two parallel rows and at locations corresponding to the locations of the terminal posts and bushings of the battery, said induction heating coils being electrically coupled to said bus bar such that upon energization of said generator said coils are operable for simultaneously inducing current flow in respective terminal posts and bushings concentrically located with respect to the coils for simultaneously fusing the respective terminal posts and bushings, said induction heating coils defining a water flow path through which cooling water is circulated for cooling said coils during a fusing operation, and said bus bar being operable for supporting and conducting current to said coils without water cooling.

25. The apparatus of claim 24 in which said coils each are defined by a respective uninterrupted length of copper tubing, and said respective uninterrupted lengths of copper tubing are interconnected to form a continuous cooling water flow path.

26. The apparatus of claim 25 in which said respective uninterrupted lengths of tubing each define an induction heating coil with a pair of upstanding mounting legs, and the mounting legs of said induction heating coils being interconnected by lengths of flexible tubing.

27. An apparatus for fusing lead terminal posts and bushings to form terminals of a battery comprising an induction heating generator selectively operable for generating a high frequency oscillating current,
   a T-shaped bus bar supported by and electrically coupled to said generator,
   said bus bar including a pair of L-shaped plates, said bus bar having a central bus bar section extending outwardly from said generator defined by first legs of said L-shaped plates disposed in adjacent relation to each other with an insulator therebetween, said bus bar having a transverse bus bar section at an outer end of said central section defined by second legs of said L-shaped plates that extend outwardly with respect to each other and further plate mounted adjacent said second legs with an insulator therebetween, a plurality of induction heating coils mounted on one side of said transverse section and a plurality of induction heating mounted on an opposite side of said transverse section, and said induction heating coils being electrically coupled to said bus bar such that upon energization of said generator said coils are operable for simultaneously inducing current flow in respective terminal posts and bushings concentrically located with respect to the coils for simultaneously fusing the respective terminal posts and bushings.

28. An apparatus for fusing lead terminal posts and bushings to form terminals of a battery comprising an induction heating generator selectively operable for generating a high frequency oscillating current, a T-shaped bus bar supported by and electrically coupled to said generator, said bus bar having a central section extending outwardly from said generator and a transverse section at an outer end of said central section, a plurality of induction heating coils mounted on one side of said transverse section and a plurality of induction heating coils mounted on an opposite side of said transverse section, said induction heating coils each being supported by a respective mounting structure, said mounting structures each being secured to said transverse bus bar section by mounting bolts, one of said transverse bus bar section and respective coil mounting structure being formed with vertically elongated mounting bolt receiving slots for enabling selective relative vertical positioning of the mounting structure and respective induction heating coil relative to the transverse bus bar section, and said induction heating coils being electrically coupled to said bus bar such that upon energization of said generator said coils are operable for simultaneously inducing current flow in respective terminal posts and bushings concentrically located with respect to the coils for simultaneously fusing the respective terminal posts and bushings.

29. The apparatus of claim 28 in which said mounting structures each are formed with vertically elongated mounting bolt receiving apertures.

30. An apparatus for fusing lead terminal posts and bushings to form terminals of a battery comprising an induction heating generator selectively operable for generating a high frequency oscillating current, a bus bar supported by and electrically coupled to said generator, said bus bar having a T-shape configuration with a central section extending outwardly from said generator and a transverse section at an outer end of said central section, a plurality of said induction heating coils mounted on one side of said transverse section and a plurality of induction heating coils being mounted on an opposite side of said transverse section, said coils each being supported on said transverse bus section by a respective mounting structure that permits selected vertical positioning of the coil relative to the transverse bus bar section, each said mounting structure including a pair of L-shaped plates which each have first and second legs, and said induction heating coils being electrically coupled to said us bar such that upon energization of said generator said coils are operable for simultaneously inducing current flow in respective terminal posts and bushings concentrically located with respect to the coils for simultaneously fusing the respective terminal posts and bushings.

31. The apparatus of claim 30 in which the L-shaped plates of each mounting structure have first legs disposed in adjacent relation to each other with an insulator therebetween, and said mounting structure is supported by said transverse bus bar section by a second leg of at least one of the L-shaped plates of the mounting structure.

32. The apparatus of claim 31 in which the coils each are supported by and electrically connected to the first legs of the L-shaped plates of the respective mounting structure.

33. The apparatus of claim 31 in which each mounting structure is supported in cantilevered outwardly extended relation to one end of said transverse bus bar section by the second leg of one of the L-shaped plates of the mounting structure.

34. An apparatus for fusing lead terminal posts and bushings to form terminals of a battery comprising an induction heating generator selectively operable for generating a high frequency oscillating current, a bus bar supported by and electrically coupled to said generator, a plurality of induction heating coils each supported on said bus bar by a respective mounting structure that permits selected vertical positioning of the coil relative to the transverse bus bar section, said mounting structures each being secured to said bus bar by mounting bolts, one of said bus bar section and respective coil mounting structure being formed with vertically elongated mounting bolt receiving slots for enabling selective relative vertical positioning of the mounting structure relative to the transverse bus bar section, and said induction heating coils being electrically coupled to said bus bar such that upon energization of said generator said coils are operable for simultaneously inducing current flow in respective terminal posts and bushings concentrically located with respect to the coils for simultaneously fusing the respective terminal posts and bushings, and said induction heating coils each being releasably and vertically adjustably supported on said bus bar for permitting predetermined substantially uniform positioning of the coils relative to respective terminal posts and bushings for enabling simultaneous, substantially uniform depth fusion of said terminal posts and bushings.

35. The apparatus of claim 34 in which each mounting structure is supported in cantilevered outwardly extended relation to one end of said transverse bus bar section by the second leg of one of the L-shaped plates of the mounting structure.

* * * * *